United States Patent [19]
Hensel et al.

[11] Patent Number: 5,242,756
[45] Date of Patent: Sep. 7, 1993

[54] POLYESTER FILM HAVING IMPROVED ADHESION PROPERTIES

[75] Inventors: Hartmut Hensel, Klagenfurth, Austria; Peter Dinter, Oestrich-Winkel, Fed. Rep. of Germany; Theo Grosse-Kreul, Wiesbaden, Fed. Rep. of Germany; John D. Gribbin, Schlangenbad, Fed. Rep. of Germany

[73] Assignee: Hoechst Aktiengesellschaft, Frankfurt am Main, Fed. Rep. of Germany

[21] Appl. No.: 630,699

[22] Filed: Dec. 20, 1990

[30] Foreign Application Priority Data

Jan. 3, 1990 [DE] Fed. Rep. of Germany ....... 4000038

[51] Int. Cl.$^5$ .......................... B32B 27/06; G11B 5/66
[52] U.S. Cl. .............................. 428/480; 428/694 ST; 428/900; 428/910; 428/694 SG; 204/192.1
[58] Field of Search ................ 428/480, 694, 900, 910; 204/192.1

[56] References Cited

U.S. PATENT DOCUMENTS

| | | | |
|---|---|---|---|
| 3,950,206 | 4/1976 | Adachi et al. | 428/480 |
| 4,524,108 | 6/1985 | Kawakami | 428/480 |
| 4,710,421 | 12/1987 | Ono et al. | 428/694 |

Primary Examiner—Paul J. Thibodeau
Assistant Examiner—Leszek Kiliman
Attorney, Agent, or Firm—Gregory N. Clements

[57] ABSTRACT

The biaxially stretch oriented, corona-treated polyester film, in particular polyethylene terephthalate film, is suitable as a base film for magnetic coatings. It exhibits the following features: at least one of its two surfaces exhibits a surface tension of at least 43 mN/m without an adhesion promoter having been added; the modulus of elasticity in the machine direction and/or transverse direction is greater than 5800 N/mm$^2$; and the refractive index perpendicular to the film plane is less than or equal to 1.4900.

7 Claims, No Drawings

POLYESTER FILM HAVING IMPROVED ADHESION PROPERTIES

BACKGROUND OF THE INVENTION

1. Field Of The Invention

The invention relates to a biaxially stretch-oriented polyester film, in particular a biaxially oriented poly(ethylene terephthalate) film (BO-PET film) which, due to its abrasion and adhesion behavior toward coatings, is particularly suitable as a base film for magnetic tapes.

2. Prior Art

As is known, films of this type (BO-PET) are provided with an adhesion-promoting coating, applied in an aqueous dispersion or in an organic solvent.

It is also known, from U.S. Pat. No. 4,524,108, to treat a poly(ethylene terephthalate) film with a corona discharge treatment before application of the magnetic layer. In this reference, however, the corona discharge treatment only results in an improvement in the adhesion if the proportion of molecules in the vertical direction, i.e., the proportion of molecules oriented toward the coating on the film is particularly large. The refractive index serves as a measure of the proportion of vertical molecules. According to this publication, the adhesion is particularly good if the refractive index in the direction of the thickness of the biaxially stretch oriented poly(ethylene terephthalate) film is at least 1.4990.

It is evident from the comparison experiments of this reference that significant delamination of the magnetic layer occurs, in spite of corona treatment, at values of 1.4946 and 1.4905 for the refractive index. A refractive index of at least 1.4990 can only be achieved in "balanced"BO-PET films. "Balanced"means that the mechanical properties are approximately equal both in the longitudinal direction and the transverse direction and are at a relatively low level. The moduli of elasticity measured in the longitudinal and transverse directions are of approximately equal magnitude and are about 5800 N/mm$^2$ (Newtons per millimeter squared).

In BO-PET films having a relatively high modulus of elasticity in the longitudinal film direction (greater than 6000 N/mm$^2$), the orientation in the plane is so high that the perpendicular refractive index is significantly below 1.4990, even below 1.4900. According to U.S. Pat. No. 4,524,108, films of this type are said to have poor abrasion resistance and poor adhesive strength to magnetic coatings, even if they have been subjected to a corona discharge. This also applies to the coatings applied on the "reverse"or underside of the film for magnetic tapes, which coatings are intended to ensure good running behavior of base films having particularly smooth surfaces on the "reverse"surface (the "reverse"surface of the film is the surface typically having no magnetic layer). The binder coatings which are customary for the reverse surface (for example, polyurethane resins) are thus even more critical with respect to adhesion to the film surface than are the binder coatings for the magnetic layer.

The object of the present invention is thus to find a biaxially oriented polyester film which is suitable, without an adhesion-promoting layer, as a base film for magnetic coatings, i.e., has good abrasion resistance and adhesion properties, and good mechanical properties. This object is achieved by the film of the present invention.

SUMMARY OF THE INVENTION

Surprisingly, it has thus been shown that, in the case of "semitensilized"film (for example, a modulus of elasticity in the film longitudinal direction of about 6000 N/mm$^2$), and tensilized polyester films (for example, a modulus of elasticity of at least 7000 N/mm$^2$), and "supertensilized" film (for example, a modulus of elasticity of at least 8500 N/mm$^2$), wherein the refractive index in the direction of the thickness of the film is less than or equal to 1.4900, treatment by electric corona discharge (which has already been carried out by the film manufacturer) is quite sufficient to achieve a significant improvement in adhesion, even for the relatively critical reverse surface.

It is particularly surprising that even a coating applied on the film after a storage time of more than 2 months following the corona treatment adheres better than a coating applied without corona treatment. In contrast to the teaching of U.S. Pat. No. 4,524,108, it has been found that the coated, corona-treated surfaces of films of the present invention, having a lower refractive index in the direction of the thickness of the film, also exhibit significantly improved abrasion resistance.

In the broadest sense, the present invention is directed to a biaxially oriented polyester film in which at least one surface exhibits a surface tension of at least 43 mN/m (millinewtons per meter) on the polyester surface without the addition of an adhesion promoter, a modulus of elasticity in the machine (longitudinal) direction of greater than 5800 N/mm$^2$, and a refractive index in the direction of the film thickness of less than or equal to 1.4900.

In the broadest sense, the present invention is also directed to a magnetic tape composed of a biaxially oriented polyester film in which at least one surface exhibits a surface tension of at least 43 mN/m on the polyester surface without the addition of an adhesion promoter, a modulus of elasticity in the machine direction of greater than 5800 N/mm$^2$, and a refractive index in the direction of the thickness of the film of less than or equal to 1.4900, and has a magnetic layer applied to the above described surface.

DESCRIPTION OF THE PREFERRED EMBODIMENTS

The polyester materials employed are polyesters built up from units of aliphatic or aromatic dicarboxylic acids and aliphatic or aromatic diglycols. Mixtures of different polyesters are also suitable. Examples of polyesters are polycondensates of terephthalic acid, isophthalic acid and/or 2,6-naphthalenedicarboxylic acid with aliphatic glycols having 2 to 10 carbon atoms. Examples of specific polyesters are: poly(ethylene terephthalate), poly(tetramethylene terephthalate), poly(butylene terephthalate), poly-(1,4-cyclohexylene-dimethylene terephthalate), poly(ethylene 2,6-naphthalenedicarboxylate), or poly(ethylene p-hydroxybenzoate).

The copolyesters may also be employed in the present invention and may contain any of the above noted dicarboxylic acids blended with minor amounts of other dicarboxylic acids such as adipic acid, sebacic acid, phthalic acid, isophthalic acid, sodium 5-sulfoisophthalate, and polyfunctional components, such as trimellitic acid, inter alia.

The polyester mixtures may comprise, for example, poly(ethylene terephthalate) and poly(butylene terephthalate) or poly(ethylene terephthalate) and at least one alkali metal salt of a derivative of sulfonic acid, such as, for example, sulfoisophthalic acid or ammonium isophthalic acid.

The polyester may also be blended with minor amounts of other polymers. Examples of such polymers which can be incorporated or mixed into the polyester are olefin homopolymers or olefin copolymers such as polyethylene, polypropylene, poly-4-methyl-1-pentene, ethylene-vinyl acetate copolymers (which may themselves be hydrolyzed), ionomers, polyamides, polycarbonates, polytetrafluoroethylene, and polysulfones, inter alia.

The polyester raw material contains, if desired, the additives customary for improving the slip or antifriction properties in the production of magnetic tape base films. Such additives are, for example, inorganic pigments, such as $CaCO_3$, $SiO_2$, kaolin, $BaSO_4$ and $TiO_2$, or crosslinked organic polymer particles. Additional customary additives, such as nucleation agents, antioxidants, antistatics, thermostabilizers, waxes and dyes, may also be added as is conventionally known.

The polyester film is generally produced by extrusion. The molten polyester material is extruded through a flat-film die and chilled as an amorphous prefilm on a chill roll. This film is subsequently reheated and stretched in the longitudinal and transverse directions, or in the transverse and longitudinal directions, or in the longitudinal, transverse and again in the longitudinal direction. The stretching temperatures are generally between about 100 to about 130° C. The draw ratio for longitudinal stretching is from about 2 to 6, and preferably 3 to 4.5. The draw ratio for transverse stretching is from about 2 to 5, particular from 3 to 4. Where appropriate, the draw ratio of the second longitudinal stretching may be from about 1.1 to 3. The first longitudinal stretching may, if desired, be carried out at the same time as the transverse stretching (simultaneous stretching). Drawing is followed by thermosetting of the film at 150° to 240° C., in particular 180° to 220° C., thus greatly reducing the tendency of the film to shrink.

The draw ratios mentioned mean that the film is preferentially oriented in the machine direction.

A so-called "$F_5$"value, i.e., the tension necessary to elongate a film by 5 percent of the initial length, is determined as a measure of the strength thereby gained. $F_5$ values of greater than about 150 $N/mm^2$ are desired.

The film may be built up in one or more layers, the individual layers comprising polyester and essentially differing only in the additives. Multilayer films are generally produced by lamination, preferably by coextrusion. The layer formation allows, in particular, the advantages that the various additives employed contribute to the film in a desired manner. The surface properties and surface roughnesses are influenced by the additional coating of the film with solutions or dispersions containing, inter alia, crosslinkable, curable or already crosslinked or cured substances or particles, as is known in the art. The coating is preferably carried out using an in-line coating process, i.e., coating the film between the stretching stages or after the orientation.

The surface modification of the polyester film using electric corona discharge is carried out in a manner known per se after completion of the film, i.e., after the thermosetting. To this end, the film web to be treated may be passed over an electrically earthed counterelectrode, for example in the form of a roll, and the electric charging is effected by subjecting one or both sides of the film web to an electric corona discharge produced by applying a high-frequency alternating current of high voltage to an electrode arranged at a distance from the roll (see U.S. Pat. Nos. 4,239,973 and 4,929,319).

When the film is used as a base film for magnetic recording media (for example in tape form as an audio tape, video tape or computer tape), the magnetic layer comprising polymeric binder and magnetic powder is applied to one of the two surfaces of the film in a customary manner. A non-magnetic back coating, which facilitates running of the tape over sliding contact surfaces, is provided on the opposite surface of the film. The back coating is preferably applied to the corona-treated surface, but it is also possible to pretreat both surfaces of the film with a corona discharge.

The invention is explained in greater detail by means of the example below.

EXAMPLE

A raw material of poly(ethylene terephthalate) containing 0.2 percent by weight of silicon dioxide particles as antifriction agent was melted, molded in a flat-film die and chilled on a highly polished chill roll at a temperature of about 30° C. to give an amorphous cast sheet. This cast sheet was subsequently stretched at about 95°°C. in the transverse direction by a factor of about 3.5, and then stretched at about 115° C. in the longitudinal direction by a factor of about 4. The film was subsequently thermoset at about 190° C. The film was treated on the surface with a 10,000 Hz and 10,000 V corona discharge unit at a power of about 1 kW. The film thickness was 30 microns, the modulus of elasticity in the longitudinal direction was 6000 N/mm (measured in accordance with DIN 53457), and the refractive index in the film thickness direction was 1.4890 (measured using an Abbe' refractometer).

After storage for about 80 days, the film was processed to form a magnetic recording tape. The first surface was coated with a magnetic layer, and the opposite "reverse"surface, which had been pretreated by the above described corona discharge, was coated with carbon black particles embedded in a polyurethane binder. An additional adhesion promoter layer was not present on either surface of the film.

The adhesive strength of the carbon black/polyurethane coating to the base film was assessed by a simple adhesion test. To this end, a "cross hatch pattern" was cut into the carbon black/polyurethane coating, the cuts being made about 3 mm apart. A piece of adhesive tape was pressed on at an angle of 45° to the cut perpendiculars and then removed rapidly. The adhesion was determined from the number of squares still adhering to the film surface after this test.

In the case of the corona-treated film, an adhesion of 100 percent (i.e., all layer areas still adhered) was determined, even after the film had been stored for 80 days before coating. In the case of an identical film which had been produced without corona treatment, the adhesion failed completely (i.e., the layer peeled off completely).

That Which is Claimed:

1. A biaxially stretch oriented polyester film, suitable as a base film for magnetic coatings comprising:
    a biaxially oriented polyester film having 2 surfaces, at least one of said two surfaces having a surface tension of at least 43 mN/m without an adhesion promoter having been added;
    a modulus of elasticity in the machine direction greater than 5800 $N/mm^2$; and a refractive index in the direction of the thickness of the film of less than or equal to 1.4900, wherein said at least one surface of the film has been subjected to a corona discharge treatment after thermosetting.

2. The film as claimed in claim 1, which contains inorganic and or organic additives, or inorganic and organic additives.

3. The film as claimed in claim 1, which is laminated with at least two layers of polyester containing additives.

4. The film as claimed in claim 1, wherein said corona discharge treatment is performed at 10,000 V and 10,000 Hz.

5. A magnetic tape comprising:
a) a biaxially oriented polyester film having two surfaces, with at least one of said surfaces having tension of at least 43 mN/m, without the use of an adhesion promoter: a modulus of elasticity in the machine direction greater than 5800 N/mm$^2$; and a refractive index perpendicular to the film plane of less than or equal to 1.4900; and
b) a magnetic coating applied to said at least one surface, said coating applied in an effective amount to enable magnetic recordings.

6. The magnetic tape of claim 5, wherein the surface of said film not having said magnetic coating thereon has a non-magnetic coating applied thereto in an effective amount to improve the runnability of said tape.

7. The magnetic tape of claim 5, wherein said film has been corona treated prior to the application of said magnetic coating.

* * * * *